United States Patent [19]

Hartwell

[11] Patent Number: 5,544,179
[45] Date of Patent: Aug. 6, 1996

[54] MIS-SYNCHRONIZATION DETECTION SYSTEM USING A COMBINED ERROR CORRECTING AND CYCLE IDENTIFIER CODE

[76] Inventor: David Hartwell, 33 Woodward La., Boxboro, Mass. 01719

[21] Appl. No.: 382,953

[22] Filed: Feb. 1, 1995

Related U.S. Application Data

[63] Continuation of Ser. No. 860,534, Mar. 30, 1992, abandoned.

[51] Int. Cl.⁶ ........................................... G06F 11/00
[52] U.S. Cl. .................. 371/471; 371/42; 371/21
[58] Field of Search .................. 371/47.1, 46, 37.1, 371/37.7, 42, 37.2, 37.3, 37.5, 2.1, 5.4

[56] References Cited

U.S. PATENT DOCUMENTS

| | | | |
|---|---|---|---|
| 3,832,684 | 8/1979 | Besenfelder | 321/61 |
| 4,654,480 | 3/1987 | Weiss | 371/47.1 |
| 4,797,951 | 1/1989 | Duxbury et al. | 371/47.1 |
| 4,825,438 | 4/1989 | Bennett et al. | |
| 4,959,834 | 9/1990 | Aikawa | 371/47.1 |
| 5,001,712 | 3/1991 | Splett et al. | |
| 5,025,458 | 6/1991 | Casper et al. | 371/47.1 |
| 5,131,012 | 7/1992 | Dravida | 371/47.1 |
| 5,132,991 | 7/1992 | McNesby | 371/47.1 |
| 5,146,462 | 9/1992 | Cucchi | 371/47.1 |
| 5,172,381 | 12/1992 | Karp et al. | 371/47.1 |
| 5,185,740 | 2/1993 | Kurose et al. | 371/47.1 |
| 5,237,593 | 8/1993 | Fisher et al. | 371/47.1 |
| 5,321,754 | 6/1994 | Fisher et al. | 371/47.1 |

OTHER PUBLICATIONS

Freeman, "Telecommunication Transmission Handbook" 3rd. ed. 1991 pp. 785–788.
Haykin, "Communication Systems" Copyright 1978, 1987, 1994, pp. 566–567.

*Primary Examiner*—Robert W. Beausoliel, Jr.
*Assistant Examiner*—Joseph E. Palys
*Attorney, Agent, or Firm*—Mark J. Casey; Denis G. Maloney; Arthur W. Fisher

[57] ABSTRACT

A transmitting node generates error correction symbols by encoding data using error correction code integrated with information which identifies the data cycle in which the data are to be transmitted, the integrated encoded data having the same number of bits as the error correction code has alone. A node receiving the data generates error correction symbols encoding the received data using error correction code integrated with information which identifies the data cycle in which the receiving node is operating. A comparison is made of the transmitting node error correction symbols received with the receiving node generated error correction symbols, and if the two sets of symbols do not match, the receiving node detects and, if possible, corrects errors in the data using the error correction code. Alternatively, the receiving node may remove the data cycle information from the received error correction symbols and perform a comparison using standard error correction code applied to the received data.

13 Claims, 4 Drawing Sheets

MIS-SYNCHRONIZATION DETECTION SYSTEM USING A COMBINED ERROR CORRECTING AND CYCLE IDENTIFIER CODE

This application is a continuation of application Ser. No. 07/860,534, filed Mar. 30, 1992 now abandoned.

FIELD OF INVENTION

The invention relates generally to computer systems and, in particular, to a mechanism for ensuring that communicating nodes on the system are in synchronism.

BACKGROUND OF THE INVENTION

A computer system consists of a number of devices, termed "nodes," interconnected by one or more system buses. In a system of interest here, the nodes communicate with each other by sending address/control information and data over a bus in various address/control and data cycles. A transmitting node may send the data and control information to a particular node or it may broadcast the data and information to every node on the system.

The nodes on one system bus can communicate with the nodes on a second system bus through a bridge, which is a node that is essentially connected to each of the system busses. A bridge receives on one bus data which is intended for one or more nodes on the second system bus, and it then transmits the data on the second bus to the intended receiving node.

In order for a node which receives data over a bus to interpret the data correctly, the node must be in synchronism with the node which transmitted the data. In some systems, for example, a data transfer involves two or more cycles in which a node transmits in a first cycle "x" data bits in parallel over the bus and some time later transmits another x data bits in a second cycle. Since the nodes transmit the data in two separate data cycles, a receiving node must be operating in, for example, a first data cycle to interpret or utilize correctly the data bits transmitted in the first data cycle. Otherwise, if the receiving node and the transmitting node are out of synchronism, the receiving node may assign the data to an incorrect use by associating them with the wrong data cycle. When this happens, the node produces errors which may not be detected.

Before transmitting the data bits, the transmitting node may encode them for error protection using an error correction code and generate error correction symbols. The node then appends the error correction symbols to the data to form error correction code words and transmits each of the code words in parallel over the bus. The receiving node manipulates the code words to detect and, if possible, correct errors in the code word data. The error correction procedure ensures that the data is either error-free or labeled as erroneous. It does not, however, detect or correct the type of errors caused by a mis-synchronization of the transmitting and the receiving nodes, that is, errors caused by associating the data with the wrong data cycle.

One solution is to transmit the cycle number along with the data by appending to the data a plurality of "cycle bits." For a system with four data cycles, for example, two extra bits are appended to the data, and thus, two extra transmission lines are required. This solution is both expensive to implement, and it does not protect the cycle number from transmission errors. To protect the cycle bits from transmission errors, one or more parity bits must be included in the transmission, which further increases the number of required transmission lines.

SUMMARY OF THE INVENTION

In accordance with the invention, a node encodes data to be transmitted using an error correction code to form error correction symbols and encodes into the error correction symbols information which identifies the data cycle in which the data are to be transmitted. The node then transmits the data and the encoded error correction symbols as a code word. A receiving node decodes the code word by re-encoding the code word data to produce new error correction symbols and encoding into these error correction symbols information which identifies the data cycle in which the node is then operating. The receiving node then compares these error correction symbols with the received error correction symbols, and if the two sets of symbols do not match, the node detects and, if possible, corrects errors in the data using the error correction code.

If the receiving node is operating in synchronism with the transmitting node, it encodes into the error correction symbols the same cycle information that the transmitting node encoded into the code word error correction symbols. The error correction symbols are thus the same as the error correction symbols generated by the transmitting node, and the symbols can be used to detect and correct errors in the data.

If, however, the receiving node is not operating in synchronism with the transmitting node, the receiving node encodes into the error correction symbols different cycle information than was encoded into them by the transmitting node. The node thus introduces errors into the error correction symbols. When the node then attempts to correct errors in the received code word using these error correction symbols, it determines that the errors are associated with the included cycle information. The location of the errors indicates to the receiving node that there is a synchronization problem. The receiving node disregards the received data and sends to a system controller a mis-synchronization signal.

Alternatively, the receiving node may remove the data cycle information from the received error correction symbols. The node then encodes the received data to generate new error correction symbols and compares these error correction symbols with the received error correction symbols to determine the number and location of errors in the received code word. If the transmitting and receiving nodes are operating in synchronism, the receiving node removes from the received error correction symbols the same cycle information that the transmitting node encoded into them and the symbols should match those generated by again encoding the data. A comparison of these generated symbols and the received symbols reveals either no errors or random errors throughout the code word. If, however, the two nodes are out of synchronism, the receiving node removes from the received error correction symbols data cycle information which is different than the information encoded into them by the transmitting node. A comparison of the two sets of symbols then reveals that the errors are associated with the included cycle information.

BRIEF DESCRIPTION OF THE DRAWINGS

The invention will be pointed out with particularity in the appended claims. The above and other advantages of the invention may be better understood by referring to the following description taken in conjunction with the accompanying drawings, in which:

DETAILED DESCRIPTION OF THE INVENTION

Figure 1:
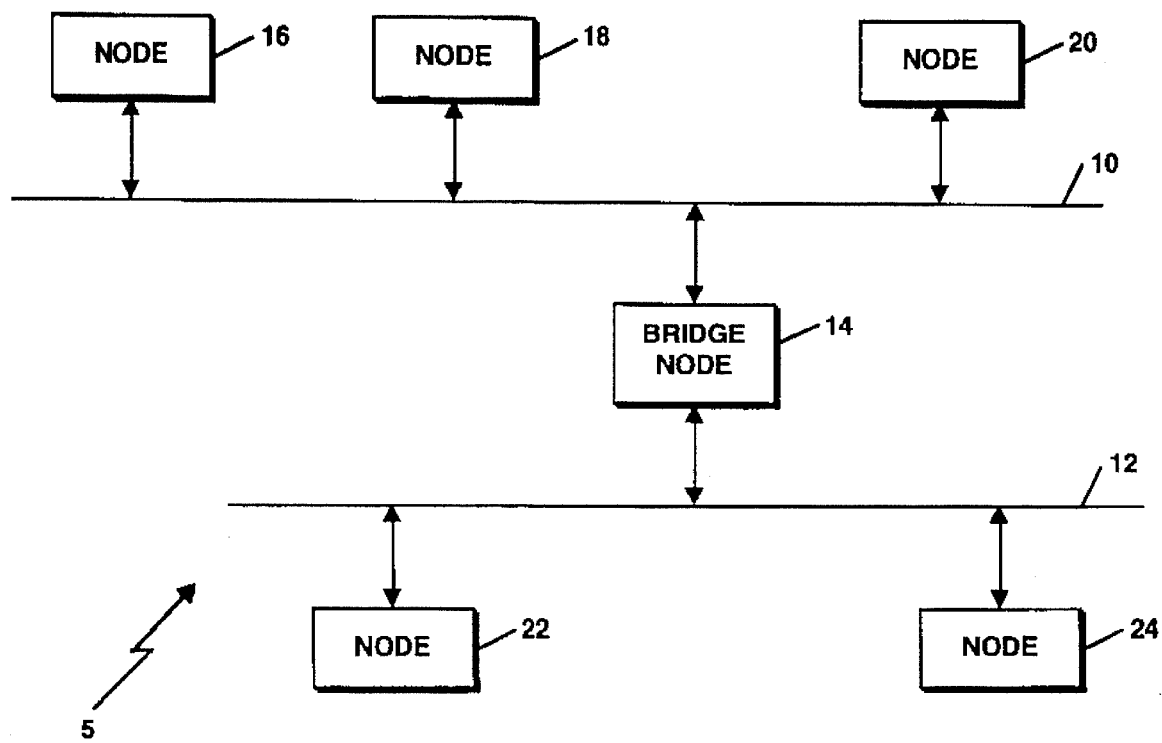
FIG. 1 is a block diagram of a portion of a multiple node, multiple bus computer system.

FIG. 1 depicts a portion of a multiple node computer systems which includes two system busses 10 and 12 which are interconnected by a bridge node 14. A node 16 on the bus 10, e.g., may communicate with any or all of the other nodes 18, 20, 22 and 24 on the system 5 by sending data over the bus 10. If the data is intended for one or more nodes on the system bus 12, the bridge 14 captures the data on bus 10 and re-transmits it on bus 12.

Figure 2:
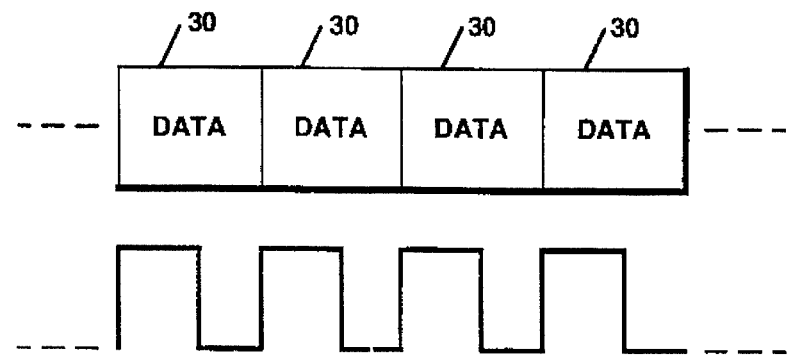
FIG. 2 depicts a transmission sequence.

A transmitting node sends information over the bus 10, 12 in a number of predetermined transmission cycles as depicted in FIG. 2. Each cycle begins, for example, on a rising edge of the system bus clock signal. In one such system the data are sent in four consecutive data cycles 30.

Figures 3, 4:
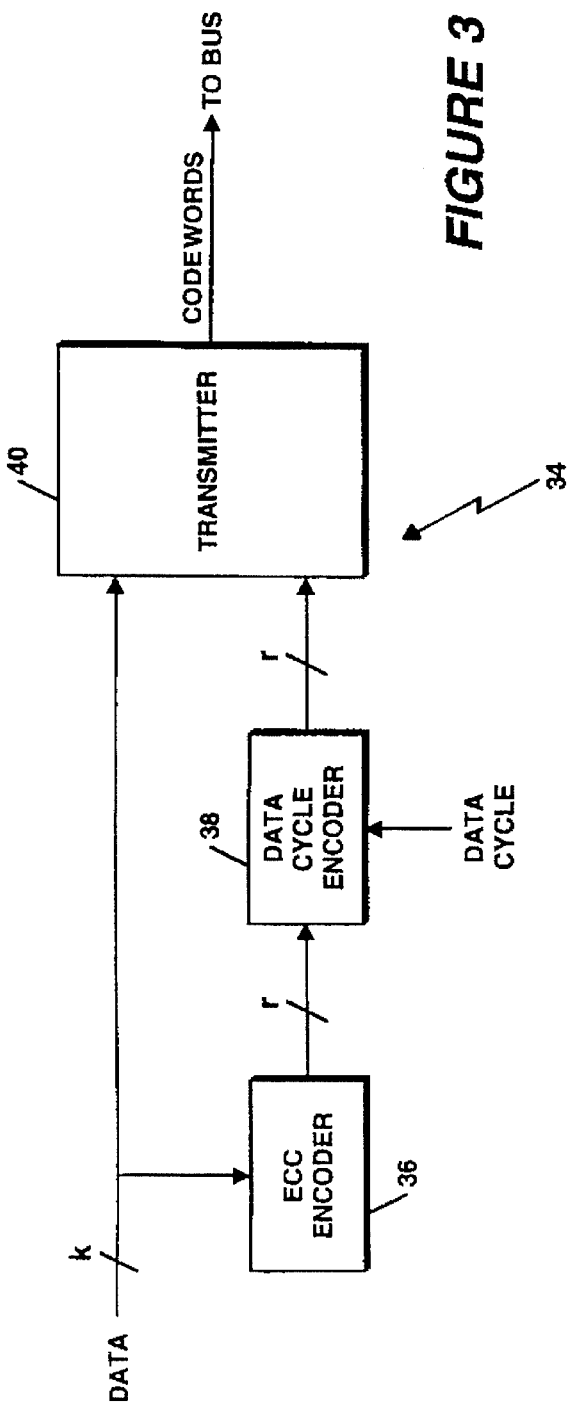
FIG. 3 is a functional block diagram of an error correction system which is included in each node in the system depicted in FIG. 1 for forming codewords for the transmission of data.
FIG. 4 depicts an encoding matrix which illustrates the configuration of a preferred embodiment of an encoder of FIG. 3.

Before the transmitting node sends the data over the bus, it encodes them using an error correction code to produce error correction symbols. FIG. 3 depicts in block diagram form an encoding system 34 which is included in each of the nodes. Data, in "k"-symbol blocks, are applied to an ECC encoder 36. The ECC encoder 36 manipulates the data to form "r" error correction symbols.

The ECC encoder 36 supplies the r error correction symbols to a data cycle encoder 38. The data cycle encoder 38 combines these r symbols with information which identifies the data cycle in which the data are to be transmitted and produces r encoded error correction symbols, as described in more detail with reference to FIG. 4. A transmitter 40 receives both the data and the encoded error correction symbols and appends the error correction symbols to the data to form code words. The transmitter 40 then transmits the code words over the bus in the appropriate data cycles.

In a particular embodiment, ECC encoder 36 encodes thirty two one-bit data symbols, or data bits, in accordance with an encoding matrix 44, depicted in FIG. 4, to produce seven one-bit error correction symbols S0–S6. The error correction symbols are generated by XOR'ing or XNOR'ing certain of the data bits together. A "1" in the matrix indicates that the corresponding data bit is included in the particular XOR or XNOR operation. For example, the data bit labeled 31 in the left-most column of the matrix is included in the XOR operations associated with the generation of error correction symbols S6, S5, S4 and S0 and the XNOR operation associated with the generation of error correction symbol S2. The code is designed to correct single bit-errors and detect double bit-errors.

The error correction symbols S6–S0 are then encoded in accordance with matrix 46, where C1 and C0 are cycle bits which correspond to a binary representation of the associated data cycle. The data cycle encoder 38 combines one or both of the cycle bits C1 and C0 with error correction symbols S6–S3, S1 and S0 in a series of XOR and XNOR operations. For instance, the error correction symbol S6 is XOR'ed with cycle bit C1 to produce a result. This result is then XOR'ed with the cycle bit C0 to produce the combined code for S6. This process is repeated for all of the error correction symbols S6–S0, using matrix 46 to determine which code bits are used in the encoding process. The cycle information is thus included in six of the seven error corrections symbols. Alternatively, the data and the cycle number information may be encoded to generate the error correction symbols in a single encoding step. In any event, the data cycle encoder 38 produces a combined code that has the same length as the error correction symbols.

Figure 5:
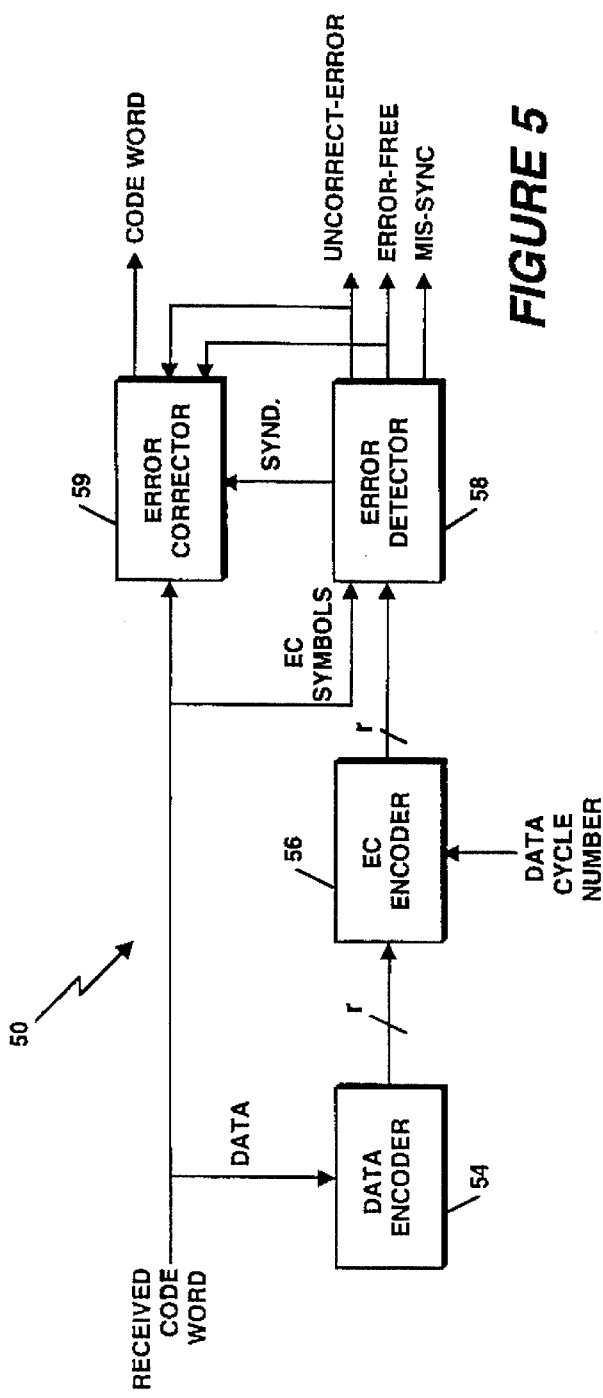
FIG. 5 is functional block diagram of a preferred decoder error correction system for receiving codewords.

Referring now to FIG. 5, there is shown a preferred embodiment of a system for detecting and, where possible, correcting any errors in received code words using two encoding operations. When a node receives the transmitted code words it supplies them to a data encoder 54 which encodes them in accordance with the error correction code, that is, matrix 44, to produce r new error correction symbols. The node then applies the r new error correction symbols to an EC encoder 56 which encodes into them data cycle information that identifies the data cycle in which the node is then operating. An error detector 58 compares these r error correction symbols with the code word error correction symbols to generate error correction syndromes, and using the syndromes in a conventional manner, it detects errors in the code word. The error detector 58 then supplies the syndromes to an error corrector 59, which corrects, if possible, the errors in the code word.

If the transmitting and receiving nodes are out of synchronism, the receiving node introduces one or more errors into at least five of the generated error correction symbols by its encoding into the symbols the receiving node data cycle information. When the node compares these error correction symbols with the code word error correction symbols, it determines from the resulting syndromes that the errors are associated with the included cycle information, assuming the cycle information associated with the receiving node differs from the cycle information associated with the transmitting node by a number of bits which is within the error correcting capability of the error correction code. The error detector 58 then sends to a system controller (not shown) a mis-synchronization signal which indicates that the transmitting and receiving nodes are out of synchronism.

The receiving node can distinguish a situation in which it is out of synchronism with the transmitting node from a situation in which a transmission is corrupted by, for example, noise on the bus, by examining the numbers and locations of the code word errors, as long as the code word contains a correctable number of errors. As discussed above, a mis-synchronization results in errors associated with the inclusion of an incorrect C0 bit and/or C1 bit. A corrupted transmission typically results in random errors in the data and the error correction symbols. Accordingly, the node signals a mis-synchronization only when it detects the appropriate error condition.

In the example, the error correction code corrects single bit errors. If the transmitting node and the receiving node are out of synchronism by a single cycle, the detector detects a mis-synchronization in data cycle 0, 2 and 3. However, an uncorrectable error condition occurs when the transmitting node is transmitting in data cycle 2 and the receiving node is receiving in data cycle 1, since the cycle information differs by two bits. In such a situation the detector 58 can not determine the locations of the errors in the code word and it asserts an uncorrectable error signal instead of a mis-synchronization signal. The detector then labels the code word uncorrectable, which prevents the node from using the received data. After the related transmission cycles have been completed, the system controller essentially re-synchronizes the system nodes in response to the receipt of the mis-synchronization signals associated with data cycles 0, 2 and 3. The re-synchronization causes the receiving node to ignore data received during the preceding, related transmission cycles.

Figure 6:
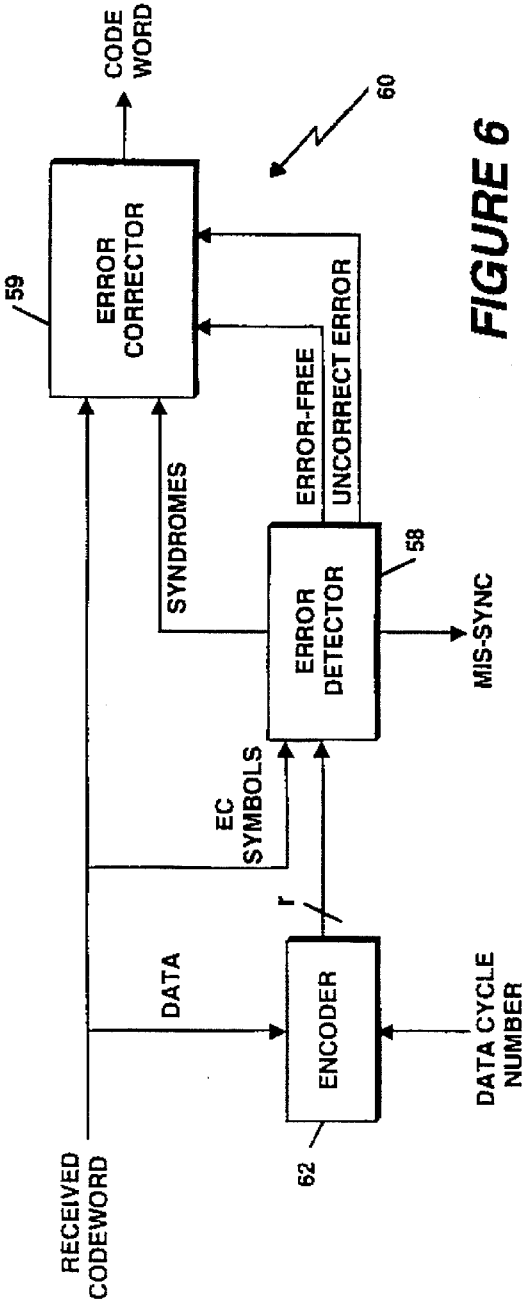
FIG. 6 depicts an alternative embodiment of the decoder of FIG. 5.

FIG. 6 depicts an alternative embodiment of an error correction system 60 using a single encoding operation. Received code word data symbols are applied to an encoder 62 which encodes them in accordance with the error correction code, that is, matrix 44 of FIG. 4, to generate a new set of r error correction symbols. The encoder 62 also encodes into the symbols data cycle information which identifies the cycle in which the node is then operating in accordance with matrix 46 of FIG. 4. The encoder 62 thus produces in a single encoding operation encoded error correction symbols.

Error detector 58 compares the encoded error correction symbols with the code word error correction symbols received over the bus and determines the number and location of errors in the received code word. If the error detector 58 determines that the errors are related to the inclusion of incorrect cycle information, the node sends a mis-synchronization signal to the system bus controller. Otherwise, the system 60 performs error detection and correction in a conventional manner.

Figure 7:
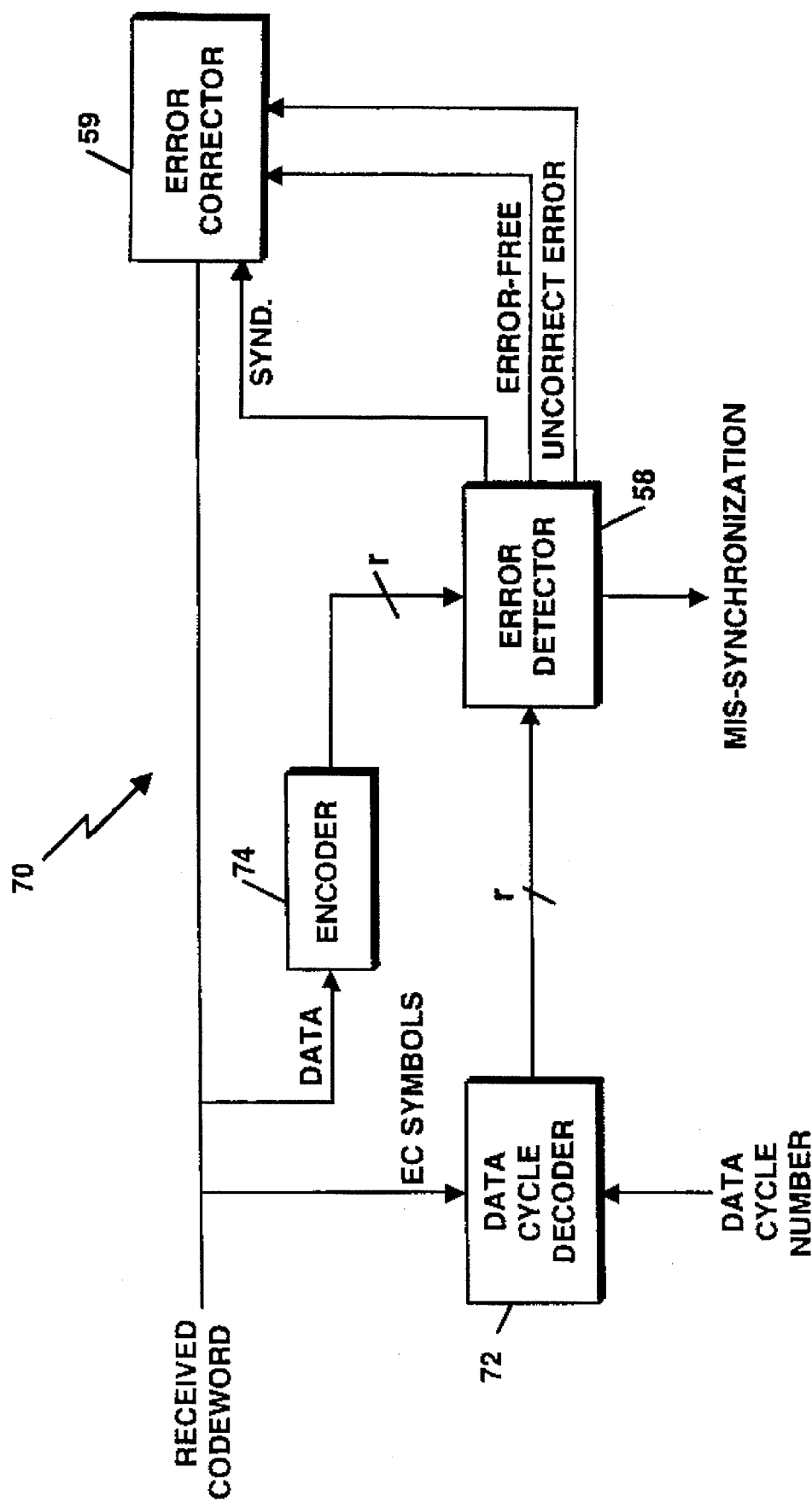
FIG. 7 shows another alternative embodiment of the decoder of FIG. 5.

FIG. 7 depicts another alternative error correction system 70 which includes a data cycle decoder 72 and a data encoder 74. The receiving node supplies to the data cycle decoder 72 the received error correction symbols and information identifying the data cycle in which the receiving node is operating when it receives the data. The data cycle decoder 72 removes the data cycle information from the received error correction symbols by XOR'ing and XNOR'ing the information and the symbols in accordance with matrix 46 (FIG. 4). If the receiving node and the transmitting node are in synchronism, the XOR and XNOR operations return the error correction symbols to values which correspond with the encoding of the data.

Data encoder 74 encodes the code word data bits in accordance with matrix 44 (FIG. 4) and generates a new set of error corrections symbols. These error correction symbols and the error corrections symbols produced by the EC encoder 72 are then supplied to error detector 58, which uses them to detect errors. If the detector determines that the errors are related to the inclusion of incorrect cycle information, the detector asserts a mis-synchronization signal. Otherwise the system 70 detects and corrects code word errors in a conventional manner.

The inclusion of data cycle information in the error correction symbols enables the nodes to determine whether or not they are in synchronism without increasing the bit count of the transmitted code word. Accordingly, the system need not include extra transmission lines dedicated to the transmission of data cycle information to send that information with the data.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

I claim:

1. A method of transmitting data between nodes in a predetermined number of data cycles over a system bus, the method including the steps of:

A. generating transmitting node error correction symbols by encoding data to be transmitted using an error correction code combined with a transmitting node data cycle identifier which identifies the cycle in which the data are to be transmitted, said error correction code and said cycle identifier comprising combined code, said combined code having the same number of bits as said error correction code alone; and B. transmitting the data and the transmitting node error correction symbols over the system bus in the data cycle.

2. The method of claim 1, further comprising the steps of a receiving node receiving the data and the transmitting node error correction symbols, and the receiving node detecting errors in received data and/or transmitting node error correction symbols, said receiving and detecting steps comprising the steps of:

C. generating receiving node error correction symbols by encoding said received data using said error correction code combined with a receiving node data cycle identifier which corresponds to the data cycle in which the receiving node was operating when the receiving node received the data and producing receiving node error correction symbols;

D. comparing the receiving node error correction symbols with the transmitting node error correction symbols;

E. if the receiving node error correction symbols do not match with the transmitting node error correction symbols, determining the number and locations of errors in the data and/or transmitting node error correction symbols;

F. asserting a mis-synchronization signal, if the errors are associated with the inclusion of the transmitting node data cycle identifier;

G. labeling the data uncorrectable, if there are an uncorrectable number of errors in the data and the transmitting node error correction symbols; and H. correcting errors in the data, if the data and the transmitting node error correction symbols include a correctable number of errors.

3. The method of claim 2, wherein the step of generating transmitting node error correction symbols includes combining said error correction code with one or more bits of a binary representation of a data cycle number.

4. The method of claim 2, wherein the step of generating receiving node error correction symbols includes combining said error correction code with one or more bits of a binary representation of the data cycle number associated with the cycle in which the receiving node was operating when the node received the received data.

5. The method of claim 1, further comprising the step of receiving by a receiving node the data and the transmitting node error correction symbols and the receiving node detecting errors in received data and/or transmitting node error correction symbols by:

C. decoding the transmitting node error correction symbols to remove the transmitting node data cycle identifier and produce transmitting node error correction symbols without the transmitting node data cycle identifier;

D. encoding the received data using the error correction code;

E. comparing the encoded received data with the decoded transmitting node error correction symbols without the transmitting node data cycle identifier to determine if the received data and/or the transmitting node error correction symbols include errors;

F. asserting a mis-synchronization signal, if the errors are associated with the inclusion of the transmitting node data cycle identifier;

G. labeling the data uncorrectable, if the data and the transmitting node error correction symbols an uncorrectable number of errors; and H. correcting errors in the data, if the data and transmitting node error correction symbols include a correctable number of errors.

6. The method of claim 1, wherein the step of generating transmitting node error correction symbols includes combining said error correction code with one or more bits of a binary representation of a data cycle number.

7. A multiple node system for transmitting data between the nodes in a predetermined number of data cycles over a system bus, the nodes each including:

A. means for generating transmitting node error correction symbols by encoding the data to be transmitted using an error correction code combined with a transmitting node data cycle identifier to form a combined code which identifies the cycle in which the data are to be transmitted, said combined code having the same number of bits as the said error correction code alone; and B. a transmitter, coupled to said means for generating, for transmitting the data and the transmitting node error correction symbols over the system bus in one or more data cycles.

8. The multiple node system of claim 7, wherein each node further includes:

C. means for receiving the data and the transmitting node error correction symbols transmitted over the system bus;

D. error correction means including:
  i. means for generating receiving node error correction symbols;
  ii. error correction symbol encoding by encoding said received data using said error correction code combined with a receiving node data cycle identifier which corresponds to the data cycle in which the receiving node which received the data was operating when the receiving node received the data, the error correction symbol encoding means producing receiving node error correction symbols;
  iii. error location means for comparing received transmitting node error correction symbols with the receiving node error correction symbols and, if the transmitting node error correction symbols do not match with the receiving node error correction symbols, determining the number and locations of errors in the data and/or transmitting node error correction symbols;

E. signaling means for asserting a mis-synchronization signal if the error location means determines that the errors are associated with the included transmitting node data cycle identifier;

F. labeling means for labeling the data uncorrectable if the error location means determines that there are an uncorrectable number of errors in the data/or and the transmitting node error correction symbols; and G. correcting means for correcting errors in the data if the error location means determines that there are a correctable number of errors associated with the data and the transmitting node error correction symbols.

9. The multiple node system of claim 8, wherein the means for generating receiving node error correction symbols includes means for combining said error correction code with one or more bits of a binary representation of the data cycle number associated with the cycle in which the receiving node was operating when the node received the data.

10. The multiple node system of claim 7, wherein the nodes each include:

C. means for receiving the data and the transmitting node error correction symbols over the system bus;

D. means for decoding the received transmitting node error correction symbols to remove the transmitting node data cycle identifier and produce transmitting node error correction symbols without the transmitting node data cycle identifier;

E. means for encoding the received data using the error correction code and comparing the encoded received data with the decoded transmitting node error correction symbols without the transmitting node data cycle identifier to determine the number and location of errors in the data and/or transmitting node error correction symbols;

F. signaling means for asserting a mis-synchronization signal if the means for encoding the received data determines that the errors are associated with the included transmitting node data cycle identifier;

G. labeling means for labeling the data uncorrectable if the means for encoding the received data determines that the data and/or the transmitting node error correction symbols contains an uncorrectable number of errors; and H. correction means for correcting errors in the data, the correction means correcting errors in the data if the means for encoding the received data determines that the data and transmitting node error correction symbols include a correctable number of errors.

11. The multiple node system of claim 7, wherein the means for generating transmitting node error correction symbols includes means for combining said error correction code with one or more bits of a binary representation of a data cycle number.

12. A node for transmitting and receiving data over a system bus in a number of predetermined data cycles, the node including:

A. means for generating transmitting node error correction symbols by encoding data to be transmitted using an error correction code combined with a transmitting node data cycle identifier to form a combined code which identifies the cycle in which the data are to be transmitted, said combined code having the same number of bits as the said error correction code alone; and B. a data transmitter, coupled to said means for generating, for transmitting the data and the transmitting node error correction symbols in one or more data cycles.

13. The node of claim 12, the node further including:

C. means for receiving data and transmitting node error correction symbols from a transmitting node;

D. error correction means which includes:
   i. means for generating receiving node error correction symbols by encoding said received data using said error correction code combined with a receiving node data cycle identifier which corresponds to the data cycle in which the data was operating when the receiving node received the data, the error correction symbol encoding means producing receiving node error correction symbols,
   ii. means for comparing received transmitting node error correction symbols with the receiving node error correction symbols and, if the transmitting node error correction symbols do not match with the receiving node error correction symbols, determining the number and location of errors in the data and/or transmitting node error correction symbols;

E. signaling means for asserting a mis-synchronization signal if the means for comparing determines that the errors are associated with the included transmitting node data cycle identifier;

F. labeling means for labeling the data uncorrectable if the means for comparing determines that there is an uncorrectable number of errors in the data and/or the transmitting node error correction symbols; and G. correcting means for correcting errors in the data if the means for comparing determines that there is a correctable number of errors associated with the data and/or transmitting node error correction symbols.

* * * * *